United States Patent [19]

Grant

[11] Patent Number: 4,507,329

[45] Date of Patent: Mar. 26, 1985

[54] MIXED SOLVENT EXTRACTION OF HOPS

[75] Inventor: Herbert L. Grant, Yakima, Wash.

[73] Assignee: S. S. Steiner, Inc., New York, N.Y.

[21] Appl. No.: 345,370

[22] Filed: Feb. 3, 1982

[51] Int. Cl.³ .................... C12C 3/00; C12C 9/02; A23L 1/28
[52] U.S. Cl. ..................... 426/600; 426/16; 426/651; 426/655; 426/429
[58] Field of Search .............. 426/600, 651, 16, 655, 426/429

[56] References Cited

U.S. PATENT DOCUMENTS

| | | | |
|---|---|---|---|
| 2,191,838 | 2/1940 | Von Horst | 99/50.5 |
| 3,433,642 | 3/1969 | Nakayama et al. | 99/50.5 |
| 3,607,298 | 9/1971 | Mitchell et al. | 99/50.5 |
| 3,787,499 | 1/1974 | Grant | 260/586 R |
| 3,798,332 | 3/1974 | Westerman et al. | 426/29 |
| 4,104,409 | 8/1978 | Vitzthum et al. | 426/655 X |
| 4,212,895 | 7/1980 | Laws et al. | 426/600 |
| 4,218,491 | 8/1980 | Laws et al. | 426/600 |

FOREIGN PATENT DOCUMENTS 1388581 6/1971 United Kingdom .
1597703 7/1977 United Kingdom .

OTHER PUBLICATIONS

Pollock, J. R. A., Brewing Science, vol. 1, Academic Press, N.Y., 1979 (pp. 347–357).

Primary Examiner—David M. Naff
Attorney, Agent, or Firm—Hayes, Davis & Soloway

[57] ABSTRACT

An improved process for the selective extraction of the alpha acids contents of hops using liquid carbon dioxide as solvent is described. Solubility of the alpha acids in liquid carbon dioxide is enhanced by addition of a minor amount of a selected organic substance which: (1) is non-reactive with the alpha acids of interest, and (2) has the following physical properties: (a) is completely soluble in liquid carbon dioxide in the operating conditions and concentrations employed, and (b) is itself a solvent for the alpha acids of interest. Preferably the organic substance is a 1 to 4 carbon atom aliphatic alcohol in an amount of about 0.1 to about 30 volume percent.

12 Claims, No Drawings

MIXED SOLVENT EXTRACTION OF HOPS

BACKGROUND OF THE INVENTION

The present invention relates to the processing of hops, and more particularly to an improved process for separating the alpha acids content of hops.

Hops are used in the prepartion of beer, ale and other malt beverages to impart certain properties to the flavor of the finished product. Sometimes whole or ground hops are added to the brew wort and the residues are removed after the mixture is boiled for the desired length of time. This procedure has been objected to as cumbersome, wasteful and time consuming. Hops are a natural product and may vary in quality. They also are subject to degradation and may produce different flavors in successive batches of beer.

In the prior art, it has been proposed to extract various constitutents from hops and to use these extracted constituents in place of hops themselves in making beer. For example, Klingel et al U.S. Pat. No. 3,364,265 describe treating a hexane extract of hops with dilute aqueous sodium hydroxide, thereafter separating the aqueous layer and recovering the alpha acids therefrom. In traditional beer making typically only 25% to 35% of the alpha acids in the original hops are utilized. By extracting the alpha acids, isomerizing them separately from the beer, and adding the iso-alpha acids produced to the beer after fermentation alpha acid utilization can be much higher, typically from 60% to 85%. A further substantial advantage in using alpha acids extracts is that they can be stored for longer periods without the usual degradation (especially of the bitter principals including the alpha acids) that occurs in hops under extended storage. On the other hand, the Klingel et al process is based on the partition of the extract products between two immiscible solvents and due to partition coefficient may result in a loss of alpha acids values. Also, special equipment is required for separation of the immiscible solvents containing the extracts.

The art also has proposed hop extraction procedures which involve the use of certain common organic solvents such as methylene chloride, trichloroethylene, hexane and/or lower aliphatic alcohols such as methanol. Reportedly, however, these solvents will readily dissolve not only the desired alpha-acids contents of the hops but in addition relatively large proportions of beta acids, tannins, chlorophyll and various other hop constituents.

According to Laws et al, U.S. Pat. No. 4,218,491, a primary extract resulting from extraction of hops with an organic solvent typically would have the following composition:

| | wt. % | | wt. % |
|---|---|---|---|
| alpha acids | 3–8 | 8–45 tannins | 0.5–5 |
| beta acids | | 8–20 chlorophyll | up to 1 |
| uncharacterized soft resins | | fines (cellular debris) | 2–5 |
| hard resins | 2–10 | inorganic salts | 0.5–1 |
| hop oil | 1–5 | residual solvent (usually $CH_2Cl_2$ or $CH_3OH$) | 0.5–2.2 |
| fats and waxes | 1–2 | water | 1–15 |
| total resins | 15–60 | | |

These figures reportedly are based on analyses for the resins performed by the method described in Analytica EBC, published by Schweizer Brauerei Rundschau, 3rd Edition, 1975, page E49 and analyses for the non-resin components especially the tannins and chlorophyll by the method described by J. Jerumanis in Bulletin Association Anciens Etudiants Brasserie Louvain, 1969, volume 65, page 113.

Thus in order to obtain high quality alpha acids suitable for isomerization the crude extract has to be further treated to purify the extract. For example, Grant U.S. Pat. No. 3,787,499 teaches preparing a hop extract by contacting the hops with a polar solvent having a solubility in water of at least 1%, concentrating the solvent, and treating the concentrated extract solution with an aqueous solution of alkali metal hydroxide to precipitate the hop resins and beta acids which can then be removed, for example, by filtering. Useful as polar solvents are mentioned methanol, ethanol, 1-propanol, 2-propanol, 1-butanol, methylene chloride and trichloroethylene. However, according to Laws et al U.S. Pat. No. 4,218,491 it is difficult to remove entirely the organic solvent from the extract; thus commercial extracts reportedly may contain over 1% by weight solvent. Whilst it is believed that residual solvents such as methanol or methylene chloride may be lost entirely during beer making, it is not considered wholly satisfactory to rely on such 'accidental' elimination of possibly noxious materials in the production of a foodstuff. Further, although there is at present no great technical difficulty in meeting the public health requirements for levels of such residual solvents there well may be difficulties in the future.

Carbon dioxide either as a liquid or supercritical gas also has been suggested as an extraction medium for hops. For example, British Patent Specification No. 1388581 describes making a hop extract by extracting hops with a variety of gases in the supercritical state with respect to temperature and pressure. Carbon dioxide is stated to be the preferred gas. Extraction under supercritical conditions with carbon dioxide reportedly yields an olive-green pasty product which contains alpha acids, beta acids, uncharacterized soft resins, hard resins and small quantities of tannins. While extraction conditions can be varied to favor yields of alpha acids proportionately higher than the concentrations in the starting hops, the best quality, i.e. purest extracts typically contain only about one-third alpha acids. According to British Patent 1388581 optimum extraction conditions involve extraction under pressure substantially in excess of the critical pressure, which for carbon dioxide is about 72.8 atmospheres, preferably in excess of 100 atmospheres (gauge) and temperatures of from 40° to 50° C. The extract thus resulting compares favorably with primary extracts obtained using organic solvents and would appear to be suitable for use in brewing beer, e.g., by addition to the kettle. On the other hand, the extract resulting from such processing is not suitable for isomerization without considerable purification to remove components which would produce adverse flavors under typical isomerization conditions. However, such purification requires the use of organic solvents, thus negating one of the main advantages (freedom from organic solvent residues) of using supercritical carbon dioxide in the extraction of hops.

The use of liquid carbon dioxide as an extraction medium for hops also is described in USSR Author's Certificate No. 167798 in the name of Pekhov, Ponamarenko and Prokopchuk and by Pekhov in MasloboinoZhirovanaya Promyshlemnost Vol. 34, part 10 (1968) pages 26 to 29. According to Pekhov et al, the product obtained by extraction of hops with liquid carbon dioxide at elevated pressures and temperatures of from 20° to 25° C. is a light brown viscous mass (which is described later might be due to iron contamination). The purity and stability of such carbon dioxide extracts is not altogether certain; however, it is believed possible to use them in beer making by addition to the kettle.

Shafton and Naboka in ISU Sev-Kauk Nauchn Tsentra UGssh Shk, Ser Tekh Nauk 1975, 3(3), 29–31 [Chem Abs Vol 84 (1976) 120046 a] referring to the work of Pekhov et al describe extracts of hops as complex mixtures of alpha-, beta- and gamma-acids, alpha-, beta- and gamma-soft resins and hard resins which are subjected to substantial deterioration, especially by fairly rapid autoxidation on storage. Such extracts could not be isomerized to give an iso-alpha acid preparation without substantial purification and, in any event, are considerably less stable under storage than conventional hop extracts made using organic solvents.

The preceeding discussion of background in the art of hop extraction procedures is taken largely from Laws et al. U.S. Pat. No. 4,218,491, which proposed to solve the prior art problems by preparing a hop extract by passing liquid carbon dioxide at elevated pressure and at temperatures of from $-5°$ C. to $+15°$ C. through a column of hop material to extract the alpha acids content thereof, and subsequently evaporating the liquid carbon dioxide in equipment constructed of materials that are chemically inert to the extract. According to Laws, et al., extracting hops using liquid carbon dioxide under the aforesaid controlled temperature conditions provides a primary hop extract comprising a mixture of alpha acids, beta acids and hop oil in major proportion. As taught in a related patent of Laws, et al., U.S. Pat. No. 4,212,895, the beta acids can readily be removed from the primary hop extract resulting by evaporating off the liquid carbon dioxide in equipment made of iron-free materials which are chemically inert to the extract, isomerizing the alpha-acids by boiling an alkaline aqueous solution of the primary hop extract, acidifying the resulting boiled solution to precipitate the beta acids, and filtering off the precipitated beta acids.

As is apparent from the above discussion of the prior art, none of the prior art procedures for extracting the alpha acids content from hops were completely satisfactory since they provided either relatively low yield of the desired alpha acids and/or poor selectivity resulting in relatively poor quality, i.e., contaminated extract.

It is thus a primary object of the present invention to provide an improved process for isolating the alpha acids content of hops which overcomes the aforesaid and other disadvantages of the prior art.

Another object of the present invention is to provide an improved solvent extraction process for isolating the alpha acids contents of hops which process is characterized by high yield and high selectivity of the desired alpha acids. Further objects of the present invention are to provide a highly selective, highly efficient process for isolating the alpha acids content of hops, a novel solvent system for use in the solvent extraction of the alpha acids contents of hops, and a novel hops extract. Still other objects of the invention will in part be obvious and will in part be apparent hereafter.

These and other objects of the present invention are achieved by extracting a hops material with a solvent which comprises a two-component mixture, a first component (A) comprising essentially liquid carbon dioxide and a second component (B) comprising essentially at least one organic substance which: (i) is non-reactive with the alpha acids and (ii) has physical properties as follows: (a) is completely soluble in the liquid carbon dioxide at the operating conditions and concentrations employed, and (b) is itself a solvent for the alpha acids of interest, component (A) being present in the mixture in major proportion. The organic substance enhances the solubility of the desired alpha acids in liquid carbon dioxide without appreciably altering the selectivity of the extraction for the alpha acids of interest.

Yet other objects of the invention will in part appear obvious and will in part appear hereinafter.

The invention accordingly comprises the processes involving the several steps and the relation of one or more of such steps with respect to each other, and the materials and products possessing the features, properties and relations of elements, all of which are exemplified in the following detailed description, and the scope of the application, as will be indicated in the claims.

In the following detailed description of the present invention the term "liquid carbon dioxide" refers to carbon dioxide ($CO_2$) in its liquid state. Carbon dioxide in liquid state is available commercially as a compressed gas.

Generally, the two-component solvent mixture useful in the extraction of hops in accordance with the present invention is prepared by blending liquid carbon dioxide and one or more selected organic substances in proportions such that the resulting solvent mixture comprises liquid carbon dioxide in major volume proportion. The organic substance may comprise as much as thirty volume percent of the two-component solvent mixture, but preferably will be present in the range of about 0.1 to about 10 volume percent. The selected organic substances may comprise any of a variety of organic compounds which: (1) are essentially non-reactive with the alpha acids of interest, and (2) have the following physical properties: (a) are completely soluble in liquid carbon dioxide at the operating conditions (pressure and temperature) and concentrations employed, and (b) themselves are solvents for the alpha acids of interest. The organic substance also should be non-toxic, i.e., food acceptable, or have a boiling point such as to ensure its removal to an acceptable concentration in subsequent processing of the recovered alpha acids, e.g., during brewing in the kettle. Amongst suitable organic substances meeting the foregoing criteria are mentioned: lower aliphatic alcohols such as methanol, ethanol, 1-propanol, 2-propanol and 1-butanol; lower alkanes such as propane, butane and hexane; lower alkenes such as ethylene, propylene and butylene, (butane-1, cis-butane-2, trans-butane-2 and isobutylene); halogenated lower alkanes and alkenes such as methylene chloride and trichloroethylene.

An unusual and interesting feature of the present invention is the ability of the aforesaid organic substances to substantially enhance the solubility of alpha acids in liquid carbon dioxide without appreciably adversely affecting desired selectivity of the solvent to the desired alpha acids. That the liquid carbon dioxide/organic substance two-component solvent is responsible for the unique consequences achieved is quite clear inasmuch as extracts of hops prepared from the same raw hops product and using only liquid carbon dioxide or one or a mixture of organic substances failed to provide comparable results.

The following examples, illustrative of principles of the present invention, are based on the liquid extraction of hops using as extraction solvent a two-component mixture comprising in major proportion liquid carbon dioxide and containing a selected organic substance in minor proportion. In Examples I to VI inclusive, the selected organic substance was added directly to the liquid carbon dioxide prior to extraction of the hops. In Example VII the selected organic substance was added directly to the hops, and the resulting mixture (slurry) was then extracted using liquid carbon dioxide. The overall procedure involved extracting a sample hops product with the two-component solvent mixture. Since the two-component solvent mixtures had boiling points substantially below ambient, extraction was conveniently accomplished in a 316 stainless steel pressure extractor vessel. The basic procedure was to charge 1000 gm aliquots of ground (40 United States Standard mesh) dried raw hops (Yakima Cluster hops) to the extractor vessel, the extractor vessel was then closed, and the extraction solvent was flowed through the vessel. All runs used 18 Kg. of liquid carbon dioxide as the extraction solvent, from standard cylinders, per extraction run, at ambient temperature (16°–18° C.), except from one run in which pure ethanol (12 Kg.) was used as the extraction solvent, with the selected organic solvent metered into the flowing liquid carbon dioxide, or added directly to the ground hops, prior to the extraction. The ground hops starting material was analyzed prior to extraction and was found to contain 7.3 wt.% of alpha acids. Therefore, each charge contained 73.0 gms of alpha acids prior to extraction. Extraction time in all cases was four hours. Extract solutions were concentrated by removing the solvent by evaporation. The resulting concentrated extract was then analyzed by standard ASBC procedures (Amercian Society of Brewing Chemists methods of analysis, 1978).

EXAMPLE I

Normal extraction using liquid carbon dioxide—A 1000 gm. sample of ground hops was extracted using liquid carbon dioxide the resulting extract solution was concentrated to remove the liquid solvent, and the extract analyzed with the results as set forth below:

Normal extraction using liquid ethanol—A 1000 gm. sample of ground hops was extracted using liquid ethanol, the resulting extract solution was concentrated to remove the liquid solvent, and the extract analyzed with the results as set forth below:

Extraction using two-component solvent mixture in accordance with present invention—A 1000 gm. sample of ground hops was extracted using liquid carbon dioxide into which was metered liquid ethanol to produce an extraction solvent containing 1.0 vol. % of ethanol, the balance liquid carbon dioxide. The resulting extract solution was then concentrated to remove the liquid solvent, and the extract analyzed with the results set forth below:

| Extraction Solvent = | Liquid $CO_2$ only | Ethanol $CO_2$ | Ethanol/$CO_2$ Mixture (1 Vol % ethanol, balance $CO_2$) |
|---|---|---|---|
| Wt. of extract = | 148.3 g. | 293.0 g. | 164.8 g. |
| % alpha acids in extract = | 43.0% | 24.3% | 42.6% |
| Wt. of alpha acids in extract = % Recovery of alpha acids = | 63.7 g. 87.3% | 71.2 g. 96.2% | 70.2 g. 96.2% |

Observations: Addition of ethanol to liquid carbon dioxide extraction solvent increases efficiency and selectivity of extraction for alpha acids.

EXAMPLE II

The purpose of this example is to show the effect of varying the concentration of the relative amounts of liquid carbon dioxide and the selected organic substance in the two-component extraction solvent mixture. The following solvent mixtures were prepared:

2 vol. % ethanol in liquid carbon dioxide
10 vol. % ethanol in liquid carbon dioxide

| Extraction Solvent = | Ethanol/$CO_2$ (2 vol. % ethanol balance $CO_2$) | Ethanol/$CO_2$ (10 vol. % ethanol balance $CO_2$) |
|---|---|---|
| wt. of extract = | 165.2 g. | 228.6 g. |
| % of alpha acids in extract = | 42.8% | 31.0% |
| wt. of alpha acids in extract = | 70.7 g. | 70.9 g. |
| % recovery of alpha acids = | 96.8% | 97.1% |

Observations

Increasing the amount of organic component increases yield of alpha acids in extract. Selectivity for alpha acids reduced when organic component comprises more than about ten volume percent of mixed solvent. Therefore, enhancement of solubility of alpha acids in liquid carbon dioxide without appreciable reduction in selectivity for alpha acids appears to occur when organic component comprises between one and ten volume percent of the extraction solvent mixture, the balance substantially liquid carbon dioxide.

EXAMPLE III

The purpose of this example is to show the use of another lower alcohol as the selected organic substance in the two-component extraction solvent mixture. For this purpose, Example I was repeated; however, using 1-propanol in place of the ethanol. Hops were extracted as before, concentrated, and resulting extract solution was analyzed as before and found to contain the following:

| Extraction Solvent | Propanol/$CO_2$ (1.5 vol. % propanol, balance $CO_2$) |
|---|---|
| wt. of extract | 164.6 g. |
| % of alpha acids in extract = | 42.9% |
| wt. of alpha acids in extract = | 70.6 g. |
| % recovery of alpha acids = | 96.7% |

EXAMPLE IV

The purpose of this example is to show the use of a lower alkane as the organic substance in the two-component extraction solvent mixture. Example I was again repeated, substituting liquid propane for the ethanol component. Hops were extracted as before, and the resulting extract solution concentrated, and analyzed as before, and found to contain the following:

| Extraction Solvent | Propane/CO$_2$ (2.0 vol. % propane Balance CO$_2$) |
| --- | --- |
| Wt. of extract = | 159.3 g. |
| % alpha acids in extract = | 43.1% |
| wt. of alpha acids in extract = | 68.7 g. |
| % recovery of alpha acids = | 94.1% |

EXAMPLE V

The purpose of this example is to show the use of a mixture of organic substances in combination with liquid carbon dioxide. Example I was again repeated, using ethanol and liquid propane with the liquid carbon dioxide. Hops were extracted as before, the resulting extract concentrated, analyzed as before, and found to contain the following:

| Extraction Solvent | Ethanol & Propane/CO$_2$ (1 vol. % ethanol, 1 vol. % propane, balance CO$_2$) |
| --- | --- |
| Wt of Extract = | 166.6 g. |
| % alpha acids in extract = | 42.2.% |
| Wt. of alpha acids in extract = | 70.3 g. |
| % Recovery of alpha acids = | 96.3% |

EXAMPLE IX

The purpose of this example is to show the effect of adding the organic substance directly to the ground hops. Example I is again repeated with the following change: the ethanol was blended with the ground hops to produce a wet mash of hops. The resulting wet mash of hops was then extracted using pure liquid carbon dioxide as before. The resulting extract solution was concentrated as before, and the resulting concentrated extract was analyzed as before and found to contain the following:

| Extraction Solvent | Ethanol on hops before CO$_2$ extraction (1 vol. % ethanol based on CO$_2$) |
| --- | --- |
| Wt. of Extract = | 203.9 g. |
| % alpha acids in extract = | 33.4% |
| Wt. of alpha acids in extract = | 68.0 g. |
| % Recovery of alpha acids = | 93.2% |

As can be seen from the foregoing, the present invention provides a novel and improved solvent extraction process and extraction solvent mixture for isolating the alpha acids contents of hops. A particular feature and advantage of the present invention is that the extract resulting compares favorably in terms of selectivity to primary extracts obtained using pure liquid carbon dioxide, while it also compares favorably in terms of yield to primary extracts obtained using pure ethanol. On the other hand, the extract resulting upon concentration contains little organic solvent residue due to the relatively small initial concentration of the organic solvent in the extraction solvent mixture. Obviously, certain changes may be made in the foregoing process and materials without departing from the scope of the invention herein involved. For example, the alpha acids may be stabilized against deterioration by reacting the alpha acids-containing extract with an oxide material in known manner so as to effect isomerization of the alpha acids. It is therefore intended that all matter contained in the above description shall be interpreted in an illustrative and not in a limiting sense.

What is claimed is:

1. A method for the selective extraction of alpha acids from hops, which method comprises the steps of: (A) contacting hops with a solvent mixture comprising liquid carbon dioxide in major volume proportion, and containing a 1 to 4 carbon atom aliphatic alcohol in an amount of about 0.1 to about thirty volume percent of said solvent mixture, which alcohol: (1) is non-reactive with said alpha acids, and (2) has the following physical properties: (a) is completely soluble in said liquid carbon dioxide in the operating conditions and concentrations employed, and (b) is itself a solvent for said alpha acids of interest, and (B) separating said solvent mixture containing dissolved alpha acids from said hops.

2. A method according to claim 1, including the step of recovering said alpha acids from said solvent mixture.

3. A method according to claim 1, wherein said aliphatic alcohol is present in said solvent mixture in amount in the range of about 0.1 to about ten volume percent.

4. A method according to claim 1 wherein said aliphatic alcohol comprises ethanol.

5. In a method for the selective solvent extraction of alpha acids from hops by contacting said hops with liquid carbon dioxide, the improvement which comprises enhancing the solubility of said alpha acids in said liquid carbon dioxide by conducting said extraction in the presence of a 1 to 4 carbon atom aliphatic alcohol in an amount of about 0.1 to about thirty volume percent of said solvent mixture, which alcohol: (1) is non-reactive with said alpha acids, and (2) has the following physical properties: (a) is completely soluble in said liquid carbon dioxide in the operating conditions and concentration employed, and (b) is itself a solvent for said alpha acids.

6. In a method according to claim 5, and including the step of recovering said alpha acids from said solvent mixture.

7. In a method according to claim 5, and including the step of adding said aliphatic alcohol to said liquid carbon dioxide prior to said extraction.

8. In a method according to claim 5, and including the step of admixing said aliphatic alcohol with said hops to form a wet mash thereof, and then extracting the resulting wet mash with said liquid carbon dioxide.

9. In a method according to claim 5, the improvement wherein said aliphatic alcohol comprises ethanol.

10. A hop extract of alpha acids in a solvent mixture which comprises liquid carbon dioxide in a major volume proportion, and containing, a 1 to 4 carbon atom aliphatic alcohol in an amount of from about 0.1 to about thirty volume percent of said solvent mixture, which alcohol: (1) is non-reactive with said alpha acids, and (2) has the following physical properties: (a) is completely soluble in said liquid carbon dioxide, and (b) is itself a solvent for said alpha acids.

11. A hop extract according to claim 10, wherein said aliphatic alcohol is present in an amount in the range of about 0.1 to about ten volume percent of said solvent mixture.

12. A hop extract according to claim 10 wherein said aliphatic alcohol comprises ethanol.

* * * * *